(12) United States Patent
Gerber et al.

(10) Patent No.: US 8,121,599 B2
(45) Date of Patent: Feb. 21, 2012

(54) SYSTEM AND METHOD FOR INFERRING WIRELESS TRAJECTORIES IN A CELLULAR TELEPHONE NETWORK

(75) Inventors: Alexandre Gerber, Madison, NJ (US);
Nicholas Duffield, Summit, NJ (US);
Robert Manzo, Clifton, NJ (US);
William Ramirez, Bogota (CO)

(73) Assignee: AT&T Mobility II LLC, Atlanta, GA (US)

( * ) Notice: Subject to any disclaimer, the term of this patent is extended or adjusted under 35 U.S.C. 154(b) by 534 days.

(21) Appl. No.: 12/343,877

(22) Filed: Dec. 24, 2008

(65) Prior Publication Data
US 2010/0159931 A1 Jun. 24, 2010

(51) Int. Cl.
*H04W 36/00* (2009.01)
(52) U.S. Cl. .................. 455/436; 455/439; 455/440
(58) Field of Classification Search .............. 455/436, 455/443, 446, 447, 448, 449, 453, 524, 525, 455/552.1, 550.1; 370/329, 331; 701/118, 701/117, 204; 340/905, 995.13
See application file for complete search history.

(56) References Cited

U.S. PATENT DOCUMENTS

| 5,537,118 | A | | 7/1996 | Appriou |
| 5,732,383 | A | * | 3/1998 | Foladare et al. ............ 455/456.5 |
| 6,044,273 | A | * | 3/2000 | Tekinay ......................... 455/446 |
| 6,577,946 | B2 | * | 6/2003 | Myr .............................. 701/117 |
| 7,181,221 | B1 | | 2/2007 | Mark et al. |
| 7,593,809 | B2 | * | 9/2009 | Rosen et al. ................... 701/119 |
| 7,755,509 | B2 | * | 7/2010 | Bespalov et al. ............. 340/905 |
| 7,848,765 | B2 | * | 12/2010 | Phillips et al. ............. 455/456.3 |
| 7,933,609 | B2 | * | 4/2011 | Lagerstedt et al. ........ 455/456.1 |
| 2002/0181419 | A1 | | 12/2002 | Zhang et al. |
| 2003/0153312 | A1 | | 8/2003 | Lee et al. |
| 2004/0109475 | A1 | | 6/2004 | Elam |
| 2005/0288024 | A1 | * | 12/2005 | Song ............................. 455/441 |
| 2006/0234701 | A1 | | 10/2006 | Wang et al. |
| 2007/0015514 | A1 | | 1/2007 | Bishop |
| 2007/0132576 | A1 | | 6/2007 | Kolavennu et al. |
| 2008/0085678 | A1 | | 4/2008 | Haug |
| 2008/0201078 | A1 | | 8/2008 | Fitzpatrick et al. |

OTHER PUBLICATIONS

"MobiCom Poster Abstract: Bandwidth Reservation using WLAN Handoff Prediction," Song et al., Mobile Computing and Communications Review, vol. 1, No. 2.

* cited by examiner

*Primary Examiner* — Jean Gelin
(74) *Attorney, Agent, or Firm* — Parks IP Law LLC; Mickki D. Murray, Esq.

(57) ABSTRACT

A device includes a processor configured to determine a number of users in each of a plurality of wireless telephone cells of a trajectory in a wireless telephone network. The processor is also configured to determine handoff data between each adjacent pair of the wireless telephone cells, and to determine a first number of users traveling along the trajectory in the wireless telephone network while on a telephone call. The processor also calculates a total number of users associated with the trajectory in the wireless telephone network based on the handoff data between each adjacent pair of the wireless telephone cells, and based on the first number of users traveling along the trajectory while on the telephone call.

18 Claims, 4 Drawing Sheets

SYSTEM AND METHOD FOR INFERRING WIRELESS TRAJECTORIES IN A CELLULAR TELEPHONE NETWORK

FIELD OF THE DISCLOSURE

The present disclosure generally relates to communications networks, and more particularly relates to a system and method for inferring wireless trajectories in a cellular telephone network.

BACKGROUND

Cellular telephone users can follow different trajectories through a cellular telephone network, such that the cellular telephone communicates with different communication towers in the cellular telephone network. During a specific time period, a number of cellular telephone users can travel along a specific trajectory, thus changing the usage of the cellular telephone network. Depending on the location of the cellular telephone network, the number of users utilizing the cellular telephone network can vary from day to day.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
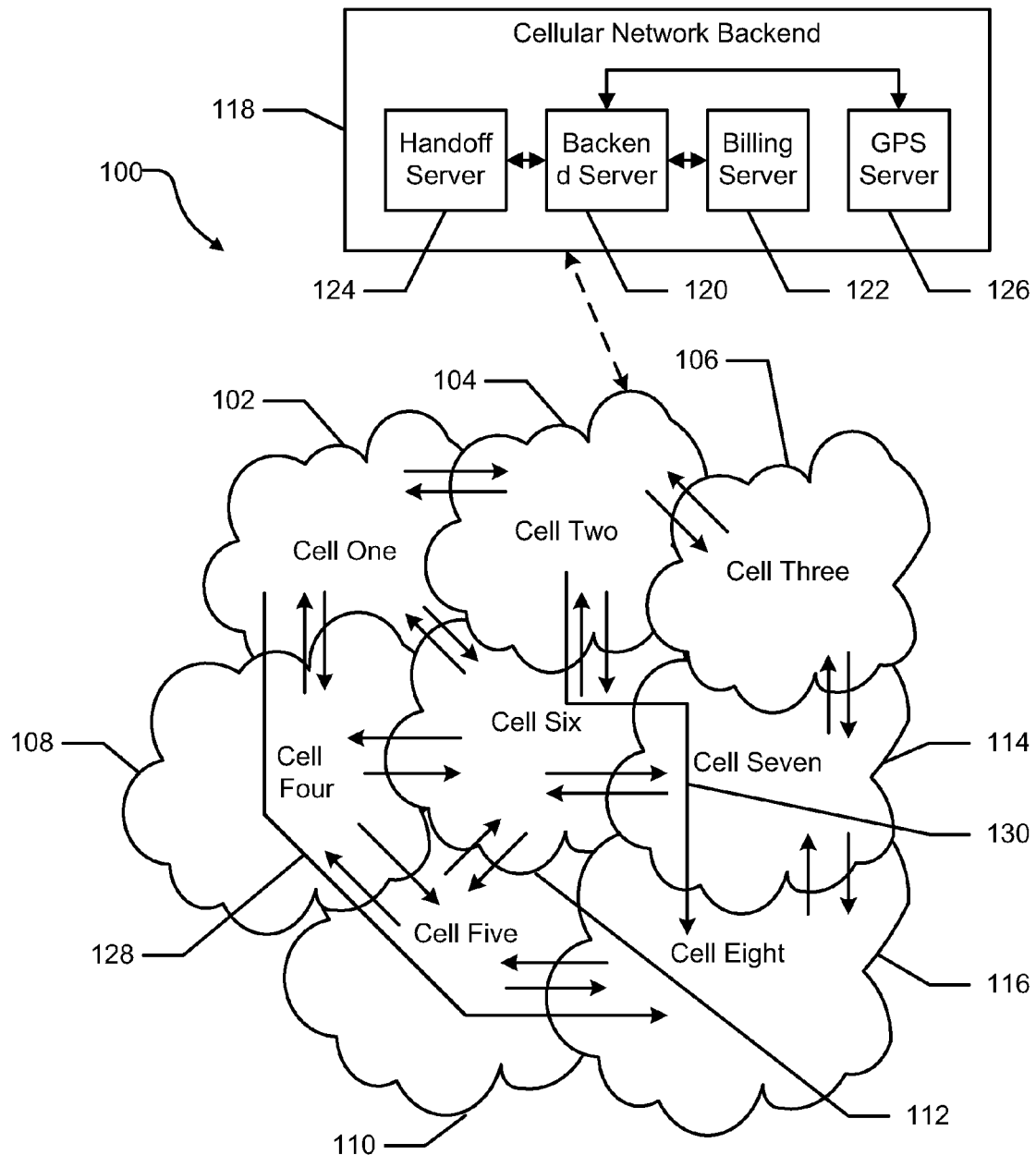
FIG. 1 is a block diagram of a cellular telephone network.

FIG. 1 shows a block diagram of a cellular telephone network 100 including cellular telephone network cells 102, 104, 106, 108, 110, 112, 114, and 116, a cellular network backend 118, a backend server 120, a billing server 122, a handoff server 124, and a global positioning system (GPS) server 126. The cellular telephone network cells 102, 104, 106, 108, 110, 112, 114, and 116 are in communication with the cellular network backend 118. The backend server 120 is in communication with the billing server 122, the handoff server 124, and the GPS server 126. The cellular telephone cells 102, 104, 106, 108, 110, 112, 114, and 116 can slightly overlap so that a user can have seamless cellular telephone service as he or she moves from one cellular telephone cell to another.

The first cell 102 overlaps with the second cell 104, with the fourth cell 108, and with the sixth cell 112. The second cell 104 overlaps with the third cell 106, and with the sixth cell 112. The third cell 106 overlaps with the sixth cell 112, and with the seventh cell 114. The fourth cell 108 overlaps with the fifth cell 110, and with the sixth cell 112. The fifth cell 110 overlaps with the sixth cell 112, and with the eighth cell 116. The sixth cell 112 overlaps with the seventh cell 114, and with the eighth cell 116. The seventh cell 114 overlaps with the eighth cell 116.

The backend server 120 can receive information about active cellular telephone users traveling through the cellular telephone network 100 from the billing server 122, as well as handoff information from the handoff server 124 and GPS data from the GPS server 126, all of which are discussed below. The backend server 120 can use the data obtained from the handoff server 124, the billing server 122, and the GPS server 126 to determine a path matrix $\{x(p)\}$, where $x(p)$ is the number of cellular telephone users that traverse a path $p=((i_1, t_1), \ldots, (i_n, t_n))$ of sequentially adjacent cells $(i_1, \ldots, i_n)$ during time intervals $(t_1, \ldots, t_n)$ respectively. For example, the backend server 120 can determine how many users travel along the path 128 which includes the first cell 102, the fourth cell 108, the fifth cell 110, and the eighth cell 116. Generally, network measurements do not provide the number of users $x(p)$ that travel along the paths p directly, but rather projections y of the number of users on subpaths q of the paths p. A cellular telephone user can travel a subpath if he or she traverses a subset of the cells of path p. For example, a cellular telephone user can travel a subpath of the path 128 if he or she travels from the first cell 102, to the fourth cell 108, to the fifth cell 110. There is a linear relation between x and y that can be written as:

$$y(q) = \sum_p A(q,p)x(p) \qquad (1)$$

where the sum extends over some set of possible paths p that contain q, and the matrix A may be an incidence matrix of q within p. The backend server 120 can receive different data from the billing server 122, the handoff server 124, and the GPS server 126 and the resulting data and matrices can be labeled as $y^{(i)}$ and $A^{(i)}$.

As the cellular telephone users move from one cellular telephone cell to another, the backend server 120 can receive and store handoff information for each of the adjacent pairs of cellular telephone cells, such as the first cell 102 and the fourth cell 108. The handoff information can identify the number of users that move from one cell to another during a specific period of time, and the handoff information can be provided to the backend server 120 by the handoff server 124. For example, the handoff server 124 can identify when a cellular telephone ends its communication with a communication tower in the fourth cell 108 and starts to communicate with a communication tower in the fifth cell 110. The handoff information can be determined for each pair of adjacent cells during a specific amount of time, such as an hour, half a day, morning commute, lunch time, and evening commute.

The handoff information can be used in a calculation to determine the number of cellular telephone users that travel along each of a number of trajectories or paths, such as trajectories 128 and 130, in the cellular telephone network 100. The handoff data can specify the number $y^{(1)}(i_1,i_2,t)$ of cellular telephone users traversing from cell $i_1$ to cell $i_2$ during time interval t. For brevity, let $l=(i_1,i_2,t)$ denote a directed pair of adjacent cells and an associated time t, such that l is a step in a path p. Thus, the path p traverses step $l=(i_1,i_2,t)$ (at time t) if $(i_1,t)$, and $(i_2,t+1)$ form successive elements of p. The handoff data can be used in the equation:

$$y^{(1)}(l) = \sum_p A^{(1)}(l,p)x(p) \qquad (2)$$

where $A^{(1)}$ is the incidence matrix, such that $A^{(1)}(l,p)=1$ when path p traverses step l, and is zero otherwise.

Additionally, the backend server 120 can receive GPS tracking information for some of the cellular telephones from the GPS server 126 as the cellular telephone users move in the cellular telephone network 100. The GPS tracking information can indicate the movement of one user through the cellular telephone network 100. The backend server 120 can also receive, from the billing server 122, cellular telephone records to determine the calls made by different users within the cellular telephone network 100 during the specific time of day. For example, a user can make a telephone call while in the third cell 106, then can receive a short message service text message while in the seventh cell 114, and can receive a telephone call while in the eighth cell 116. From this information of the cellular telephone record, the backend server 120 can determine that during a specific time period the user traveled a trajectory of the third cell 106, to the seventh cell 114, and finally to the eighth cell 116.

Additionally, the backend server 120 can receive information for the distinct paths, such as paths 128 and 130, taken by cellular telephone users while on a telephone call. This information can be a number of cellular telephone users $y^{(2)}(q)$ that followed each possible path q while on a telephone call. The cellular telephone users that traverse a path p participate in making calls whose spatial and temporal extent corresponds to a subpath q with a probability $A^{(2)}(p,q)$. $A^{(2)}$ can express a feature such as an increased probability to make a call as a function of p, a distribution of a call length depending on the duration of q, and geographic dependencies such as that cellular telephone users may be more likely to make a call from certain landmarks. Cellular telephone users can generate traffic at an average uniform rate of $a^{(2)}$ Erlangs, so that $a^{(2)}$ is the probability that at any given moment a cellular telephone user is on a telephone call. Then on average:

$$y^{(2)}(q) = a^{(2)} \sum_{p \geq q} x(p) \qquad (3)$$

In other words, equation (1) can include $A^{(2)}=a^{(2)}I(q,p)$ where $I(q,p)$ is the incidence of q in p.

A gravity model is another method that the backend server 120 can use for determining trajectories of users through the cellular telephone network 100. Upon the number of users being determined for each of the cellular telephone network cells 102, 104, 106, 108, 110, 112, 114, and 116, the backend server 120 can compare the total number of users in each cell to make a determination on the trajectory of users through the cellular telephone network 100. For example, if the fourth cell 108 has four times the number of users than the second cell 104, then it can be determined that the number of users that traveled from the first cell 102 to the fourth cell is four times that of the number of users that traveled from the first cell to the second cell. The gravity model can be applied to each cellular telephone network cell at predetermined times so that the backend server 120 can infer the number of cellular telephone users traveling the different trajectories in the cellular telephone network 100.

In the gravity model, the amount of traffic between two cells can be proportional to the product of the total traffic seen at each of the cells. The amount of traffic flowing from $(i_1,t_1)$ to $(i_2,t_2)$ can be proportional to $y^{(3)}(i_1,t_1)y^{(3)}(i_2,t_2/\delta(i_1,t_1,i_2,t_2)$ where $\delta$ is an independently specified "distance" function for the gravity model. The gravity model can be used to represent a probability of a cellular telephone user traversing $(i_1,t_1) \rightarrow (i_2,t_2)$, conditional on the cellular telephone user leaving $i_1$ at or after $t_1$.

$$M^{(2)}_{i_1,t_1,i_2,t_2} = \frac{y^{(3)}(i_2,t_2)}{\delta(i_1,t_1,i_2,t_2)} \left( \sum_{i'} \frac{y^{(3)}(i',t_2)}{\delta(i_1,t_1,i',t_2)} \right)^{-1} \qquad (4)$$

For fixed $i_1,t_1,t_2$, the probability distribution can be $M^{(2)}(y^{(3)})_{i[sub1],t[sub1],t[sub2]}$ over $i_2$. The corresponding transition probability of a general path matrix $\{x(p)\}$ can be:

$$L_{i_1,t_1,i_2,t_2} = \frac{\sum_{p:(i_1,t_1),(i_2,t_2)\in p} x(p)}{\sum_{i'} \sum_{p:(i_1,t_1),(i',t_2)\in p} x(p)} \qquad (5)$$

For fixed $i_1,t_1,t_2$, the probability distribution can be $L^{(2)}(x)_{i[sub1],t[sub1],t[sub2]}$ over $i_2$. The relative entropy of the cellular telephone users can be obtained as a sum:

$$\sum_{i_1,t_1,t_2} D\big(L^{(2)}(x)_{i_1,t_1,t_2}, M^{(2)}(y^{(3)})_{i_1,t_1,t_2}\big) \qquad (6)$$

The backend server 120 can use the equations above to determine the number of users that follow each specific trajectory through the cellular telephone network 100. For example, the backend server 120 can use the handoff information, the GPS information, the on telephone call information, and the gravity model to calculate that the first trajectory 128 has twice the number of users than the second trajectory 130. As shown in FIG. 1, the first trajectory can include the first cell 102, to the fourth cell 108, to the fifth cell 110, and finally to the eighth cell 116. The second trajectory can include the second cell 104, to the sixth cell 112, to the seventh cell 114, and finally to the eighth cell 116.

The backend server 120 can also calculate the number of cellular telephone users that travel a specific origin-destination pair. The origin-destination pair can be any starting cell combined with any ending cell without determining the cells located in between, such as the first cell 102 and the fifth cell 110, the third cell 106 and the eighth cell 116, and the like. An origin-destination pair can be a result of measurements in the cellular telephone network 100, and the measurements can be used to derive transition kernels or origin-destination pairs. A transition kernel can be based on a conditional probability that a cellular telephone user can transition a given distance from an initial location in the time between the successive calls. Any kernel can be integrated over the spatial extent of cells and over time windows to yield a transition kernel $K((i_1, t_1),(i_2,t_2))$, such that the conditional probability to be at cell $(i_2,t_2)$ after starting from $(i_1,t_1)$. For a given $(i_1,t_1)$, the corresponding probability distribution can be $M^{(4)}_{i[sub1],t[sub1]}$ over $(i_2,t_2)$. The corresponding transition probability for the general path matrix $\{x(p)\}$ can be:

$$L'_{i_1,t_1,i_2,t_2} = \frac{\sum\limits_{p:(i_1,t_1),(i_2,t_2)\in p} x(p)}{\sum\limits_{i',t'} \sum\limits_{p:(i_1,t_1),(i',t')\in p} x(p)} \quad (7)$$

For fixed $(i_1,t_1)$, the corresponding probability distribution can be $L^{(4)}_{i[sub1],t[sub1]}(x)$ over $(i_2,t_2)$. The relative entropy for an origin-destination pair can be:

$$\sum_{i_1,t_1} D\big(L^{(4)}(x)_{i_1,t_1}, M^{(4)}_{i_1,t_1,t_2}\big) \quad (8)$$

The number of users that follow a specific trajectory through the cellular telephone network 100 for a specific time period can be recalculated for multiple iterations of the time period, and the average number of users in the trajectory can be recorded as a steady-state number of users for the trajectory. Upon the steady-state number of users being calculated, each time a new number of users for the trajectory is determined, the new number of users can be compared with the steady-state number of users. If the current number of users is substantially greater than, or less than, the steady-state number of users for the trajectory, then it can be determined that an anomaly of the number of users of the trajectory is occurring. A detection of an anomaly can identify that an event is occurring such that the number of users in the trajectory has substantially varied from the steady-state number. For example, the backend server 120 can detect an anomaly for the trajectory 128 if the trajectory has a steady-state number of users of one hundred for a specific time of day, and then one day the trajectory has one thousand users during the same specific time of day.

Figure 2:
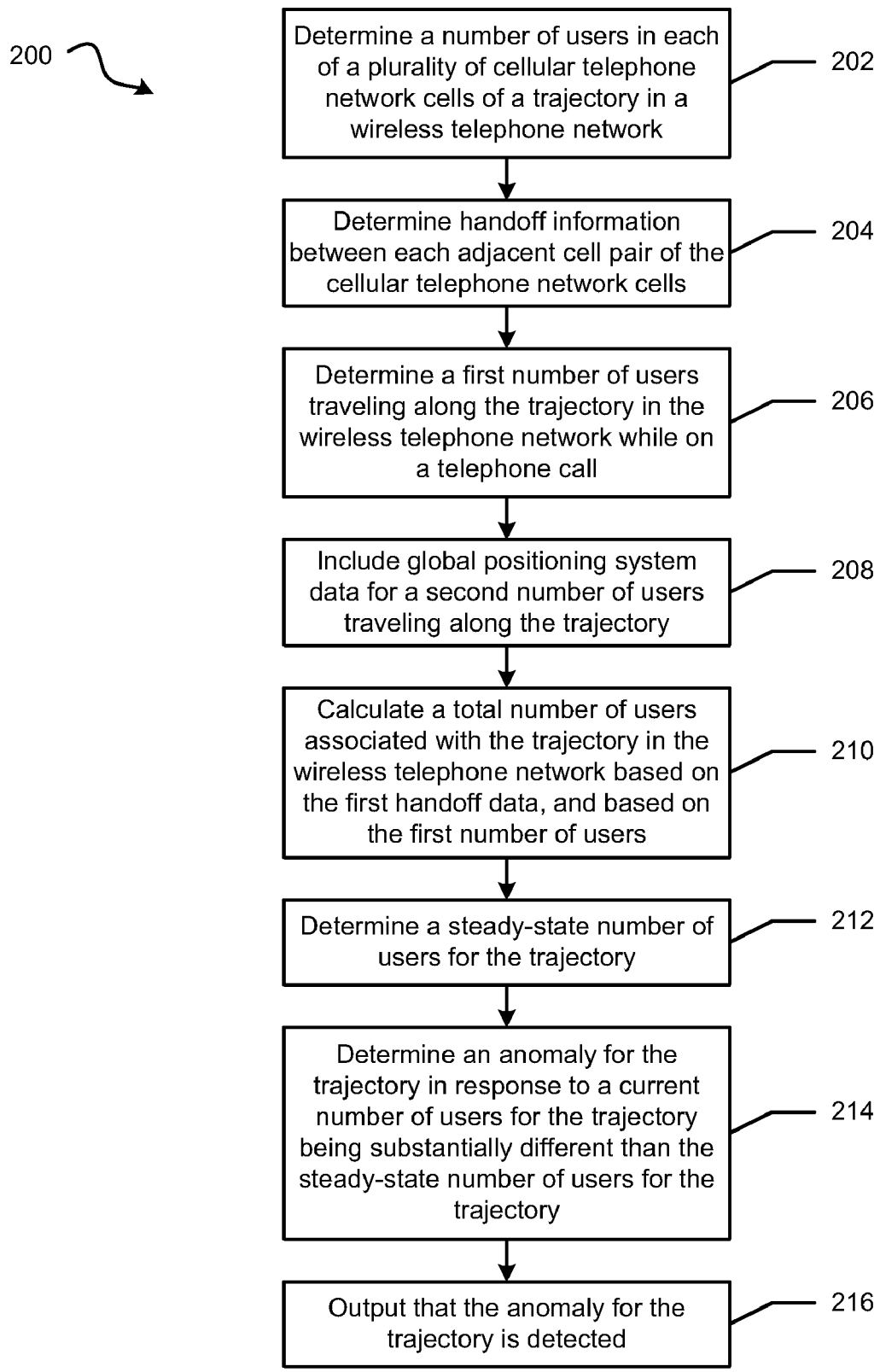
FIG. 2 is a flow diagram of a method for determining a number of cellular telephone users moving within a trajectory in the cellular telephone network.

The backend server 120 can use the handoff information to determine the number of users that follow each possible trajectory through the cellular telephone network 100. FIG. 2 shows a flow diagram of a method 200 for determining a number of cellular telephone users moving within a trajectory in a cellular telephone network. At block 202, a number of users in each of a plurality of cellular telephone network cells of a trajectory in a wireless telephone network are detected. Handoff information between each adjacent cell pair of the cellular telephone network cells is determined at block 204. At block 206, a first number of users traveling along the trajectory in the wireless telephone network while on a telephone call are determined. Include global positioning system data for a second number of users traveling along the trajectory at block 208. At block 210, calculate a total number of users associated with the trajectory in the wireless telephone network based on the first handoff data, and based on the first number of users. A steady-state number of users for the trajectory are determined at block 212. At block 214, an anomaly for the trajectory is determined in response to a current number of users for the trajectory being substantially different than the steady-state number of users for the trajectory. It is output that the anomaly for the trajectory is detected at block 216. The output can be to an emergency response service, a taxi company, a bus company, and the like.

Figure 3:
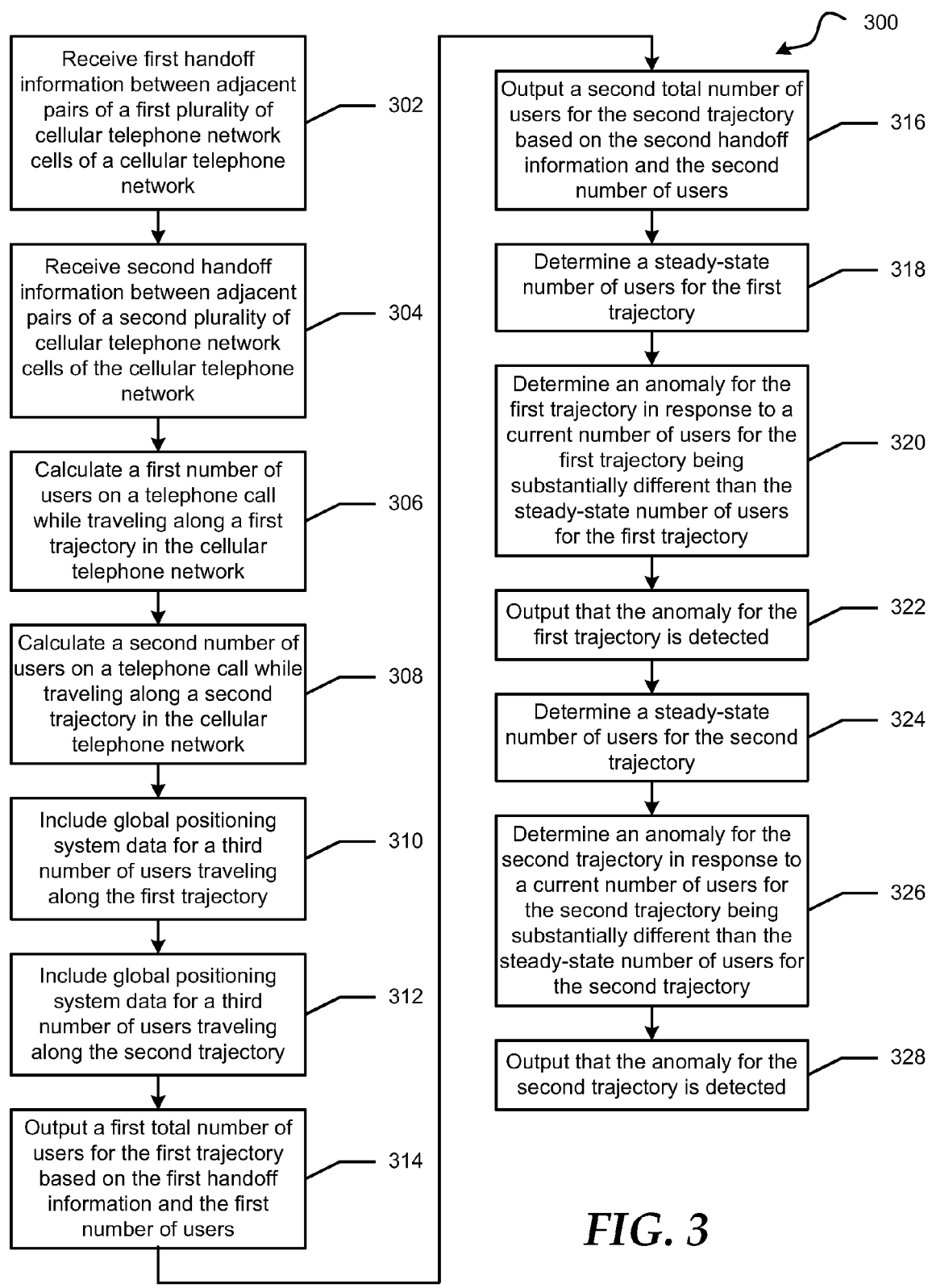
FIG. 3 is a flow diagram of a method for outputting a number of users following first and second trajectories in the cellular telephone network.

The backend server 120 can use the handoff information to determine the number of users that follow specific trajectories through the cellular telephone network 100. FIG. 3 shows a flow diagram of a method 300 for outputting a number of users following first and second trajectories in a cellular telephone network. At block 302, first handoff information between adjacent pairs of a first plurality of cellular telephone network cells of a cellular telephone network is received. Second handoff information between adjacent pairs of a second plurality of cellular telephone network cells of the cellular telephone network is received at block 304. At block 306, a first number of users on a telephone call while traveling along a first trajectory in the cellular telephone network are calculated. A second number of users on a telephone call while traveling along a second trajectory in the cellular telephone network are calculated at block 308.

At block 310, global positioning system data for a third number of users traveling along the first trajectory is included. Global positioning system data for a third number of users traveling along the second trajectory is included at block 312. At block 314, a first total number of users for the first trajectory are output based on the first handoff information and the first number of users. A second total number of users for the second trajectory are output based on the second handoff information and the second number of users at block 316.

A steady-state number of users are determined for the first trajectory at block 318. At block 320, an anomaly is determined for the first trajectory in response to a current number of users for the first trajectory being substantially different than the steady-state number of users for the first trajectory. It is output that the anomaly for the first trajectory is detected at block 322. At block 324, a steady-state number of users are determined for the second trajectory. An anomaly is determined for the second trajectory in response to a current number of users for the second trajectory being substantially different than the steady-state number of users for the second trajectory at block 326. At block 328, it is output that the anomaly for the second trajectory is detected. The output can be to an emergency response service, a taxi company, a bus company, and the like.

Figure 4:
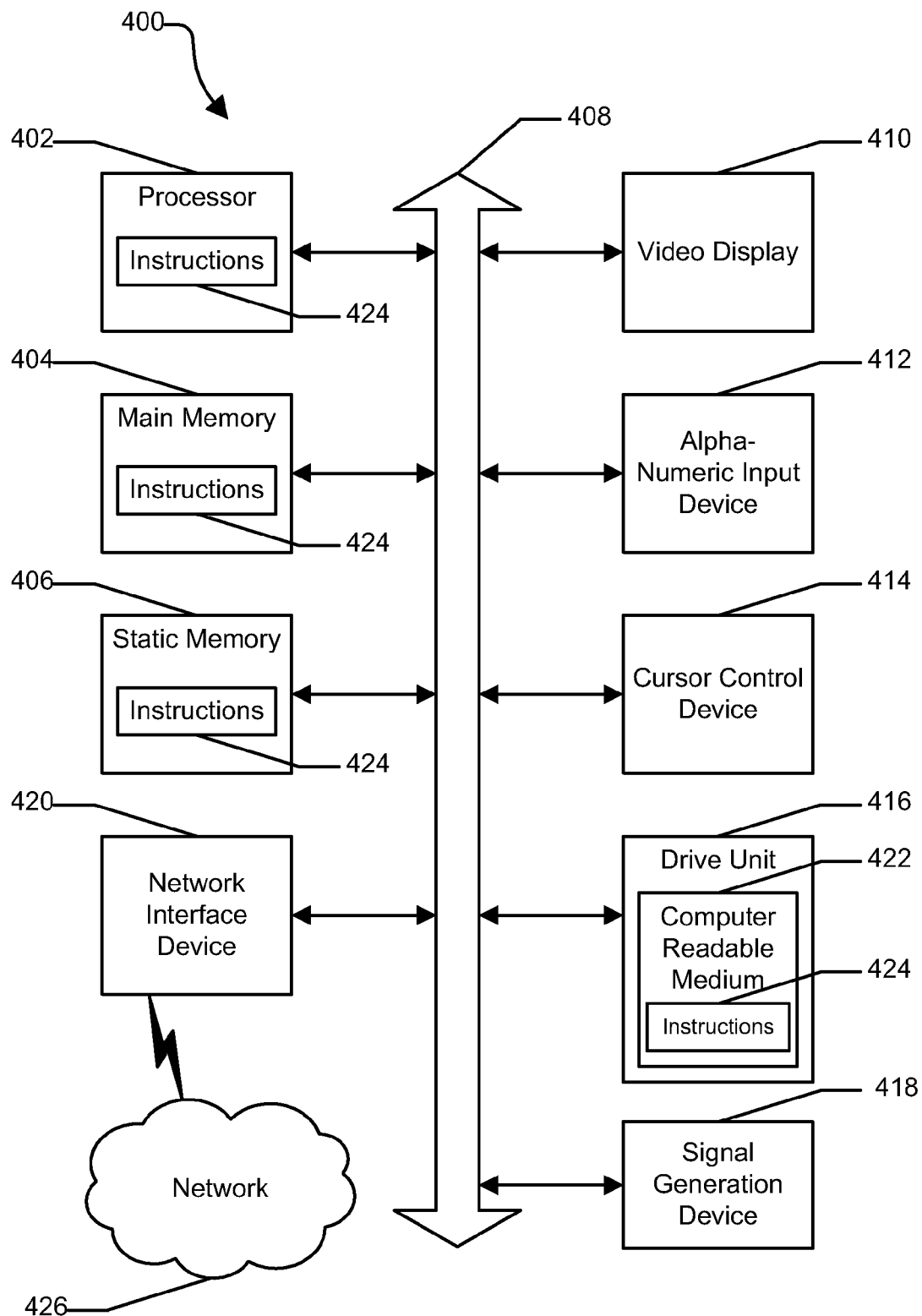
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
a processor configured to:
   determine a number of users in each of a plurality of cells of a trajectory in a wireless telephone network;
   determine handoff data between each adjacent pair of the cells;
   determine a first number of users traveling along the trajectory in the wireless telephone network while on a telephone call;
   calculate a total number of users associated with the trajectory in the wireless telephone network based on the handoff data between each adjacent pair of the cells, and based on the first number of users traveling along the trajectory while on the telephone call;
   determine a steady-state number of users for the trajectory;
   determine an anomaly for the trajectory in response to a current number of users for the trajectory being substantially different than the steady-state number of users for the trajectory; and
   output that the anomaly for the trajectory is detected.

2. The device of claim 1 wherein the handoff data is a number of users that move between each adjacent pair of the cells.

3. The device of claim 1 wherein the processor is further configured to:
   include global positioning system data for a second number of users traveling along the trajectory in calculating the total number of users.

4. A device comprising:
a processor configured to:
   receive first handoff information between adjacent pairs of a first plurality of cells of a cellular telephone network;
   receive second handoff information between adjacent pairs of a second plurality of cells of the cellular telephone network;
   calculate a first number of users on a telephone call while traveling along a first trajectory in the cellular telephone network;
   calculate a second number of users on a telephone call while traveling along a second trajectory in the cellular telephone network;
   output a first total number of users for the first trajectory based on the first handoff information and the first number of users, and a second total number of users for the second trajectory based on the second handoff information and the second number of users;
   determine a steady-state number of users for the first trajectory;
   determine an anomaly for the first trajectory in response to a current number of users for the first trajectory being substantially different than the steady state number of users for the first trajectory; and
   output that the anomaly for the first trajectory is detected.

5. The device of claim 4 wherein the processor is further configured to:
   determine a steady-state number of users for the second trajectory;
   determine an anomaly for the second trajectory in response to a current number of users for the second trajectory being substantially different than the steady state number of users for the second trajectory; and
   output that the anomaly for the second trajectory is detected.

6. The device of claim 4 wherein the processor is further configured to:
   include global positioning system data for a third number of users traveling along the first trajectory in calculating the first total number of users.

7. The device of claim 4 wherein the processor is further configured to:
   include global positioning system data for a third number of users traveling along the second trajectory in calculating the second total number of users.

8. The device of claim 4 wherein the first trajectory includes the first plurality of cells.

9. The device of claim 4 wherein the second trajectory includes the second plurality of cells.

10. A non-transitory readable medium comprising a plurality of instructions to manipulate a processor; the plurality of instructions comprising:
   instructions to determine a number of users in each of a plurality of cells of a trajectory in a wireless telephone network;
   instructions to determine handoff data between each adjacent pair of the cells;
   instructions to determine a first number of users traveling along the trajectory in the wireless telephone network while on a telephone call;
   instructions to calculate a total number of users associated with the trajectory in the wireless telephone network based on the handoff data between each adjacent pair of the cells, and based on the first number of users traveling along the trajectory while on the telephone call;
   instructions to determine a steady-state number of users for the trajectory;
   instructions to determine an anomaly for the trajectory in response to a current number of users for the trajectory being substantially different than the steady-state number of users for the trajectory; and
   instructions to output that the anomaly for the trajectory is detected.

11. The non-transitory readable medium of claim 10 wherein the handoff data is a number of users that move between each adjacent pair of the cells.

12. The non-transitory readable medium of claim 10 further comprising:
   instructions to include global positioning system data for a second number of users traveling along the trajectory in calculating the total number of users.

13. A non-transitory readable medium comprising a plurality of instructions to manipulate a processor, the plurality of instructions comprising:
   instructions to receive first handoff information between adjacent pairs of a first plurality of cells of a cellular telephone network;
   instructions to receive second handoff information between adjacent pairs of a second plurality of cells of the cellular telephone network;
   instructions to calculate a first number of users on a telephone call while traveling along a first trajectory in the cellular telephone network;
   instructions to calculate a second number of users on a telephone call while traveling along a second trajectory in the cellular telephone network;
   instructions to output a first total number of users for the first trajectory based on the first handoff information and the first number of users;
   instructions to output a second total number of users for the second trajectory based on the second handoff information and the second number of users;

instructions to determine a steady-state number of users for the first trajectory;

instructions to determine an anomaly for the first trajectory in response to a current number of users for the first trajectory being substantially different than the steady-state number of users for the first trajectory; and instructions to output that the anomaly for the first trajectory is detected.

14. The non-transitory readable medium of claim 13 further comprising:

instructions to determine a steady-state number of users for the second trajectory;

instructions to determine an anomaly for the second trajectory in response to a current number of users for the second trajectory being substantially different than the steady-state number of users for the second trajectory; and instructions to output that the anomaly for the second trajectory is detected.

15. The non-transitory readable medium of claim 13 further comprising:

instructions to include global positioning system data for a third number of users traveling along the first trajectory in calculating the first total number of users.

16. The non-transitory readable medium of claim 13 further comprising:

instructions to include global positioning system data for a third number of users traveling along the second trajectory in calculating the second total number of users.

17. The non-transitory readable medium of claim 13 wherein the first trajectory includes the first plurality of cells.

18. The non-transitory readable medium of claim 13 wherein the second trajectory includes the second plurality of cells.

* * * * *